United States Patent
Nakamura et al.

(10) Patent No.: US 11,328,039 B2
(45) Date of Patent: *May 10, 2022

(54) ELECTRONIC APPARATUS, AND METHOD OF CONTROLLING ELECTRONIC APPARATUS

(71) Applicant: KYOCERA DOCUMENT SOLUTIONS INC., Osaka (JP)

(72) Inventors: Hiroshi Nakamura, Osaka (JP); Satoshi Imai, Osaka (JP); Aya Kamakura, Osaka (JP); Hiroshi Yoshimoto, Osaka (JP)

(73) Assignee: KYOCERA DOCUMENT SOLUTIONS INC., Osaka (JP)

( * ) Notice: Subject to any disclaimer, the term of this patent is extended or adjusted under 35 U.S.C. 154(b) by 177 days.

This patent is subject to a terminal disclaimer.

(21) Appl. No.: 16/805,902

(22) Filed: Mar. 2, 2020

(65) Prior Publication Data

US 2020/0285717 A1    Sep. 10, 2020

(30) Foreign Application Priority Data

Mar. 5, 2019 (JP) .............................. JP2019-039662

(51) Int. Cl.
*G06F 21/62* (2013.01)
*G06F 21/10* (2013.01)

(52) U.S. Cl.
CPC ........ *G06F 21/105* (2013.01); *G06F 21/6209* (2013.01); *G06F 2221/0755* (2013.01); *G06F 2221/0777* (2013.01)

(58) Field of Classification Search
CPC ............... G06F 21/105; G06F 21/6209; G06F 2221/0755; G06F 2221/0777; G06F 21/629; G06F 21/121; G06F 21/445
See application file for complete search history.

(56) References Cited

U.S. PATENT DOCUMENTS 6,847,948 B1 * 1/2005 Paolini .................... G06F 21/10
  705/317
7,792,757 B2 * 9/2010 Blumenau ............. G06F 16/182
  707/662

(Continued)

FOREIGN PATENT DOCUMENTS

CN      108900311 B  *  4/2021
JP      2009271680 A     11/2009

*Primary Examiner* — David Garcia Cervetti
(74) *Attorney, Agent, or Firm* — Li & Cai Intellectual Property (USA) Office

(57) ABSTRACT

An electronic apparatus includes: an input module configured to input an export instruction and an electronic apparatus identifier, the export instruction instructing to export an application, the electronic apparatus identifier corresponding to one different electronic apparatus; a controller module configured to generate an activation key on a basis of the electronic apparatus identifier where the export instruction is input, the activation key being for activating the application only in the one different electronic apparatus, control to output a package file including the application and the activation key, and inactivate the application after a certain replacement transition time period passes, the certain replacement transition time period starting from an output time point of the package file; and an output module configured to output the package file controlled by the controller module.

7 Claims, 8 Drawing Sheets

(56) References Cited

U.S. PATENT DOCUMENTS

| | | | | |
|---|---|---|---|---|
| 7,805,375 B2* | 9/2010 | Fox | | H04L 63/0823 |
| | | | | 705/56 |
| 8,520,694 B1* | 8/2013 | Bali | | H04L 12/12 |
| | | | | 370/428 |
| 10,044,695 B1* | 8/2018 | Cahill | | H04L 63/08 |
| 10,362,108 B2* | 7/2019 | Boss | | H04L 67/04 |
| 2001/0037403 A1* | 11/2001 | Mougi | | G06F 21/10 |
| | | | | 709/200 |
| 2004/0098348 A1* | 5/2004 | Kawasaki | | G06Q 10/10 |
| | | | | 705/59 |
| 2004/0230815 A1* | 11/2004 | Goodman | | G06F 21/6218 |
| | | | | 713/191 |
| 2004/0249815 A1* | 12/2004 | Lee | | G06F 21/105 |
| | | | | 707/999.009 |
| 2005/0050116 A1* | 3/2005 | Gross | | G06Q 30/08 |
| 2005/0289559 A1* | 12/2005 | Illowsky | | G06F 8/71 |
| | | | | 719/318 |
| 2006/0106727 A1* | 5/2006 | Yellai | | G06Q 20/1235 |
| | | | | 375/E7.009 |
| 2006/0143129 A1* | 6/2006 | Holm | | G06F 8/61 |
| | | | | 705/52 |
| 2007/0027814 A1* | 2/2007 | Tuoriniemi | | G06F 21/10 |
| | | | | 705/59 |
| 2007/0226322 A1* | 9/2007 | Yamazaki | | H04L 29/12254 |
| | | | | 709/219 |
| 2007/0260550 A1* | 11/2007 | Pieper | | G06F 21/10 |
| | | | | 705/59 |
| 2008/0301447 A1* | 12/2008 | Hughes | | H04L 9/0891 |
| | | | | 713/176 |
| 2009/0018962 A1* | 1/2009 | Ying | | G06F 21/121 |
| | | | | 705/51 |
| 2009/0038018 A1* | 2/2009 | Mikami | | G06F 21/10 |
| | | | | 726/27 |
| 2009/0202078 A1* | 8/2009 | Bar-El | | G06F 21/10 |
| | | | | 380/277 |
| 2009/0228982 A1* | 9/2009 | Kobayashi | | G06F 21/10 |
| | | | | 726/26 |
| 2009/0241107 A1* | 9/2009 | Kobayashi | | G06F 21/10 |
| | | | | 726/28 |
| 2009/0274304 A1* | 11/2009 | Kobayashi | | G06F 21/10 |
| | | | | 726/26 |
| 2009/0276788 A1* | 11/2009 | Homma | | H04N 19/44 |
| | | | | 718/107 |
| 2009/0323107 A1* | 12/2009 | Maeda | | G03G 15/50 |
| | | | | 358/1.15 |
| 2010/0058478 A1* | 3/2010 | Shetty | | G06F 21/10 |
| | | | | 726/26 |
| 2010/0242117 A1* | 9/2010 | Tsuboi | | H04N 1/00973 |
| | | | | 726/26 |
| 2014/0026198 A1* | 1/2014 | Isozaki | | H04L 63/10 |
| | | | | 726/4 |
| 2014/0026228 A1* | 1/2014 | Isozaki | | G06F 21/50 |
| | | | | 726/27 |
| 2014/0122159 A1* | 5/2014 | Lei | | G06Q 10/06315 |
| | | | | 705/7.25 |
| 2014/0233459 A1* | 8/2014 | Dahod | | H04N 21/631 |
| | | | | 370/328 |
| 2014/0281548 A1* | 9/2014 | Boyer | | H04L 63/10 |
| | | | | 713/171 |
| 2015/0052224 A1* | 2/2015 | Kitahara | | H04H 60/13 |
| | | | | 709/219 |
| 2015/0092222 A1* | 4/2015 | Yasukawa | | G06F 21/608 |
| | | | | 358/1.14 |
| 2015/0282117 A1* | 10/2015 | Serna Pozuelo | | H04W 68/005 |
| | | | | 455/458 |
| 2015/0319148 A1* | 11/2015 | Lemelev | | H04L 63/06 |
| | | | | 726/30 |
| 2016/0062292 A1* | 3/2016 | Umenaga | | G03G 15/5091 |
| | | | | 399/75 |
| 2016/0103675 A1* | 4/2016 | Aabye | | G06F 8/65 |
| | | | | 717/170 |
| 2016/0344786 A1* | 11/2016 | Fawcett | | G06F 9/5011 |
| 2016/0344799 A1* | 11/2016 | Fawcett | | G06F 16/00 |
| 2016/0378959 A1* | 12/2016 | Yuki | | G06F 21/105 |
| | | | | 726/26 |
| 2017/0026677 A1* | 1/2017 | Kim | | G06F 3/0482 |
| 2017/0255762 A1* | 9/2017 | Kosovan | | G06F 21/105 |
| 2018/0039453 A1* | 2/2018 | Nakajima | | G06F 3/123 |
| 2018/0096233 A1* | 4/2018 | Asahara | | G06K 15/1805 |
| 2018/0144109 A1* | 5/2018 | Kamakura | | G06F 21/105 |
| 2018/0181452 A1* | 6/2018 | Yamawaki | | G06F 9/546 |
| 2018/0316818 A1* | 11/2018 | Negoro | | G06F 3/123 |
| 2018/0329940 A1* | 11/2018 | Tiku | | G06F 21/6245 |
| 2018/0332186 A1* | 11/2018 | Miyaguchi | | H04N 1/0097 |
| 2018/0349065 A1* | 12/2018 | Hayashi | | G06F 3/1293 |
| 2019/0095594 A1* | 3/2019 | Uchibori | | G06F 21/128 |
| 2020/0285434 A1* | 9/2020 | Nakamura | | H04L 67/34 |
| 2021/0014351 A1* | 1/2021 | Hatanaka | | H04M 1/72412 |
| 2021/0279796 A1* | 9/2021 | Simpson | | G06Q 30/0206 |

* cited by examiner

ELECTRONIC APPARATUS, AND METHOD OF CONTROLLING ELECTRONIC APPARATUS

CROSS-REFERENCE TO RELATED PATENT APPLICATION

This application claims the benefit of Japanese Priority Patent Application JP 2019-039662 filed Mar. 5, 2019, the entire contents of which are incorporated herein by reference.

FIELD OF THE DISCLOSURE

The present disclosure relates to an electronic apparatus. The present disclosure further relates to a method of controlling an electronic apparatus executable by the electronic apparatus.

BACKGROUND OF THE DISCLOSURE

Typically, when an electronic apparatus (for example, device such as image forming apparatus) is replaced, a license is transferred from an old electronic apparatus to a new electronic apparatus.

In a known technical field of electronic apparatuses, an application software (application program. Hereinafter referred to as "application") operates in the upper stage of basic software (including operating system and middleware. Hereinafter referred to as "platform") for operating an electronic apparatus. Further, an E-license key (hereinafter referred to as activation key) issued for license of an application is known.

SUMMARY OF THE DISCLOSURE

It is desirable to avoid a time period in which an application is inactivated in a new electronic apparatus and avoid invalid use of the application in an old electronic apparatus when an electronic apparatus is replaced, where the electronic apparatus has an application that requires an activation key for activation.

According to an embodiment of the present disclosure, there is provided an electronic apparatus, including:

an input module configured to input an export instruction and an electronic apparatus identifier, the export instruction instructing to export an application, the electronic apparatus identifier corresponding to one different electronic apparatus;

a controller module configured to
  generate an activation key on a basis of the electronic apparatus identifier where the export instruction is input, the activation key being for activating the application only in the one different electronic apparatus,
  control to output a package file including the application and the activation key, and
  inactivate the application after a certain replacement transition time period passes, the certain replacement transition time period starting from an output time point of the package file; and an output module configured to output the package file controlled by the controller module.

According to an embodiment of the present disclosure, there is provided a method of controlling an electronic apparatus, including:

inputting an export instruction and an electronic apparatus identifier, the export instruction instructing to export an application, the electronic apparatus identifier corresponding to one different electronic apparatus;

generating an activation key on a basis of the electronic apparatus identifier on a basis of the export instruction, the activation key being for activating the application only in the one different electronic apparatus;

controlling to output a package file including the application and the activation key; and inactivating the application after a certain replacement transition time period passes, the certain replacement transition time period starting from an output time point of the package file.

These and other objects, features and advantages of the present disclosure will become more apparent in light of the following detailed description of best mode embodiments thereof, as illustrated in the accompanying drawings.

DETAILED DESCRIPTION OF THE EXEMPLARY EMBODIMENTS

Hereinafter, an embodiment of the present disclosure will be described with reference to the drawings.

1. Apparatus Setup System

Figure 1:
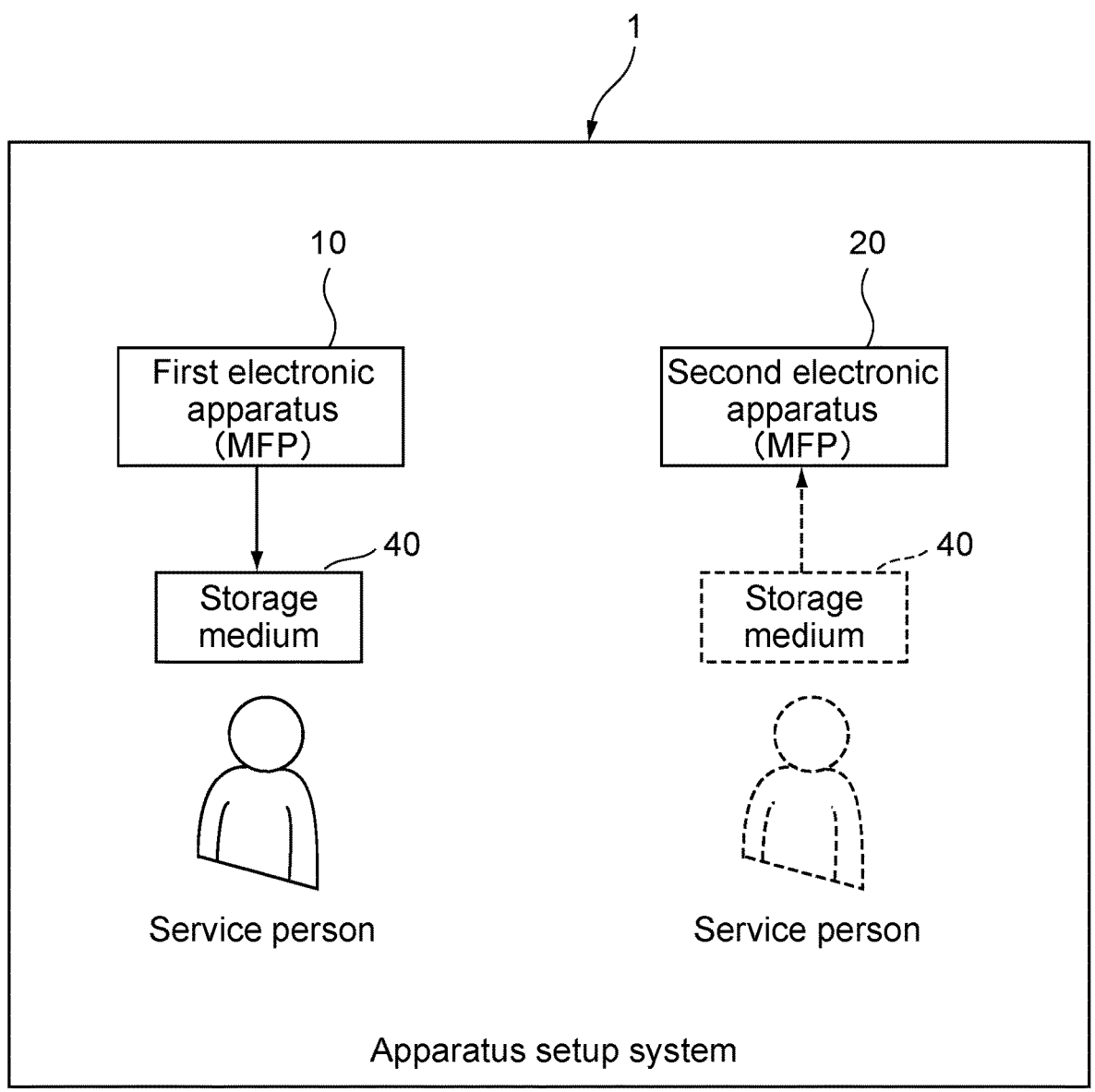
FIG. 1 shows an apparatus setup system according to an embodiment of the present disclosure.

FIG. 1 shows an apparatus setup system according to an embodiment of the present disclosure.

The apparatus setup system 1 includes the first electronic apparatus 10 and the second electronic apparatus 20. Each of the first electronic apparatus 10 and the second electronic apparatus 20 is, for example, an image forming apparatus (for example, Multifunction Peripheral, MFP).

The first electronic apparatus 10 is an old apparatus to be replaced. The second electronic apparatus 20 is a new apparatus to be carried into a site of the first electronic apparatus 10.

In the first electronic apparatus 10, a certain application is installed in the upper stage of a platform including an operating system and the like.

For example, a provider (application license seller, etc.) and a user (user of the first electronic apparatus 10 and the second electronic apparatus 20) have a license agreement, in which the application is installed in only one apparatus. In the present embodiment, the user activates the application with an activation key provided by the provider. As a result, it is assured that the application is installed in only one apparatus.

Various activation key modes are conceivable. In the present embodiment, an activation key is a text generated on a basis of an electronic apparatus identifier (serial number) unique to one electronic apparatus under a license agreement and an application identifier (serial number) identifying the application.

However, it may be burdensome for a user to file an application for an issue of an activation key. It may take time to issue the activation key. A provider may sometimes not issue the activation key promptly for sudden replacement.

Typically, when an electronic apparatus is replaced, an application for an issue of an activation key is filed in a firm that issues an application and an activation key. However, in the present embodiment, when an electronic apparatus is replaced, an application for an issue of an activation key is not filed. In the present embodiment, the first electronic apparatus 10 provides the package file P, which activates an application to be installed in the second electronic apparatus 20. As a result, a user is capable of using the application in an electronic apparatus without interruption when the electronic apparatus is replaced. Meanwhile, invalid use of the application in the first electronic apparatus 10 is prohibited.

A method of transferring the package file P from the first electronic apparatus 10 to the second electronic apparatus 20 is not limited. For example, in the present embodiment, a service person visits a client site of the first electronic apparatus 10, and operates the first electronic apparatus 10. The first electronic apparatus 10 outputs the package file P in the storage medium 40 such as a USB (Universal Serial Bus) memory. After that, the service person inputs the storage medium 40 in the second electronic apparatus 20 at a service center or the like. The second electronic apparatus 20 reads the storage medium 40, and inputs the package file P in the read storage medium 40 in the second electronic apparatus 20.

Note that the package file P may be transferred online via a network. Such apparatus setup system will be described in a modification example of the present embodiment.

2. Hardware Configuration of Electronic Apparatus

Figure 2:
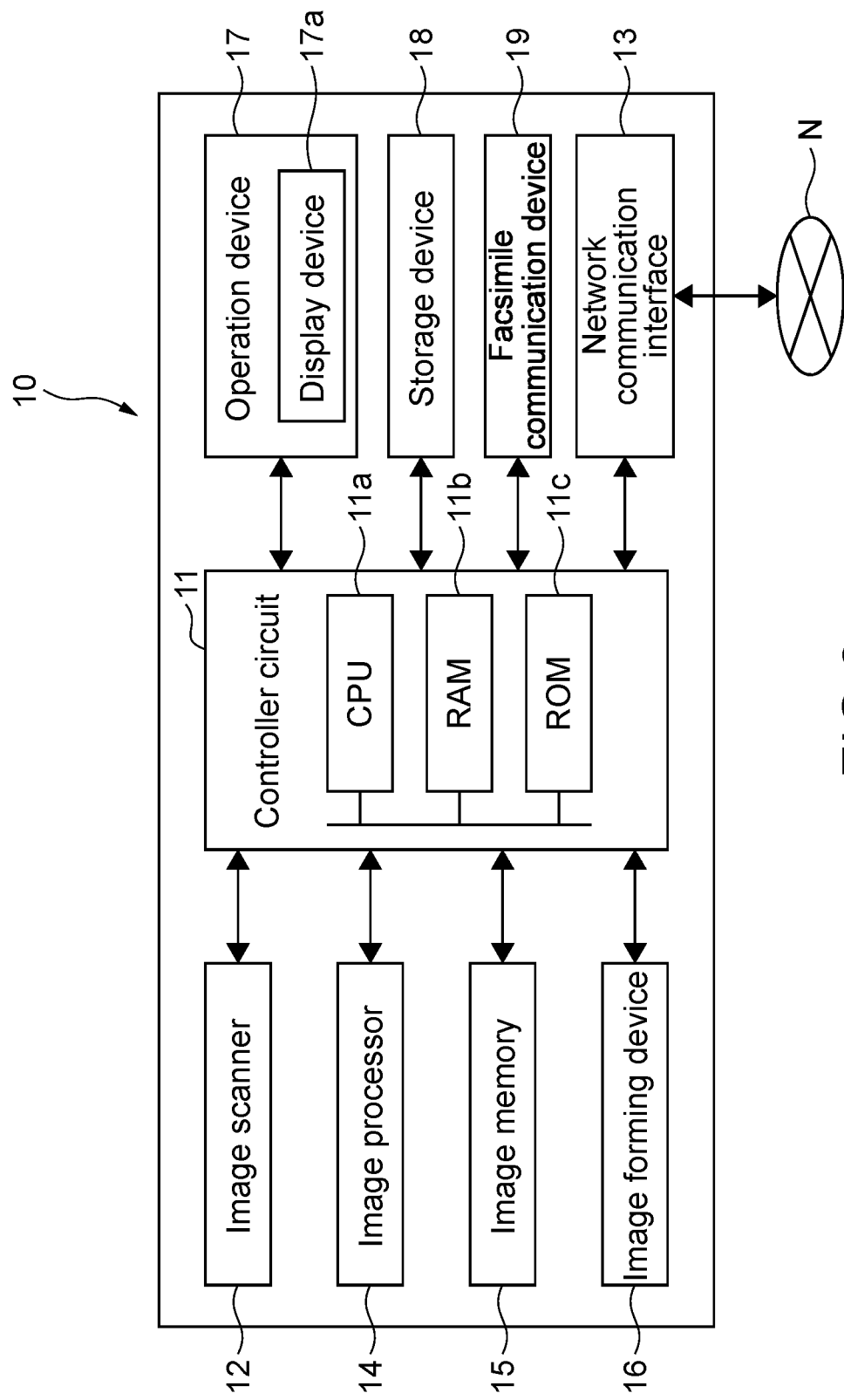
FIG. 2 shows a hardware configuration of a first electronic apparatus.

FIG. 2 shows a hardware configuration of a first electronic apparatus.

The first electronic apparatus 10 includes the controller circuit 11. The controller circuit 11 includes the CPU (Central Processing Unit) 11*a*, the RAM (Random Access Memory) 11*b*, the ROM (Read Only Memory) 11*c*, dedicated hardware circuits, and the like and performs overall operational control of the first electronic apparatus 10. The CPU 11*a* loads information processing programs stored in the ROM 11*c* in the RAM 11*b* and executes the information processing programs. The ROM 11*c* is a nonvolatile memory that stores programs executed by the CPU 11*a*, data, and the like. The ROM 11*c* is an example of a non-transitory computer readable recording medium.

The controller circuit 11 is connected to the image scanner 12, the image processor 14 (including GPU (Graphics Processing Unit)), the image memory 15, the image forming device 16 (printer), the operation device 17 including the display device 17*a* (touch panel), the large volume nonvolatile storage device 18 such as an HDD (Hard Disk Drive) or an SSD (Solid State Drive), the facsimile communication device 19, the network communication interface 13, and the like. The controller circuit 11 performs operational control of the respective devices connected thereto and sends/receives signals and data to/from those devices. The operation device 17 (touch panel) is one mode of an input module. A sound input module including a microphone may be provided as an input module.

Figure 3:
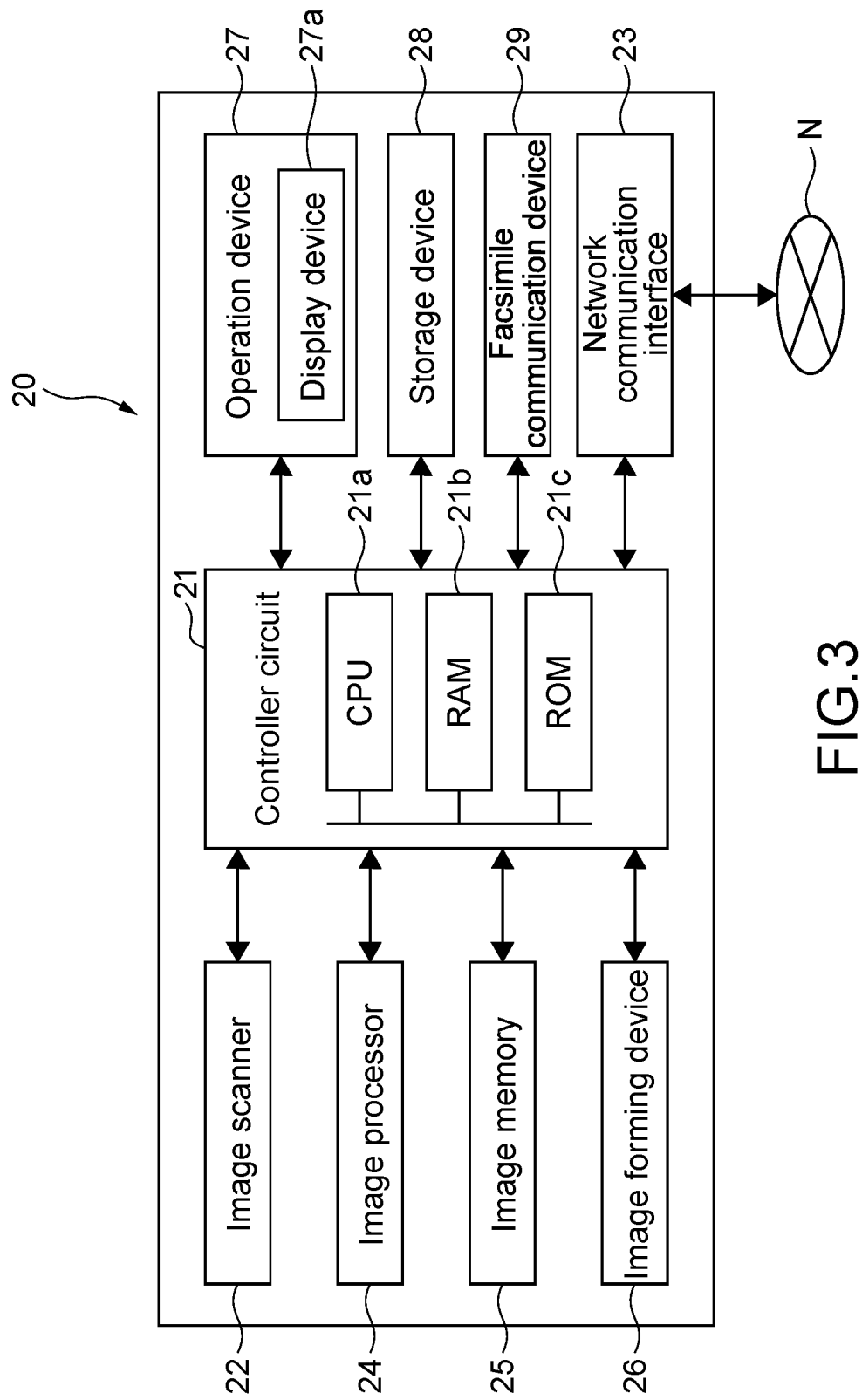
FIG. 3 shows a hardware configuration of a second electronic apparatus.

FIG. 3 shows a hardware configuration of a second electronic apparatus.

A hardware configuration of the second electronic apparatus 20 is similar to the hardware configuration of the first electronic apparatus 10. The second electronic apparatus 20 includes the controller circuit 21. The controller circuit 21 includes the CPU (Central Processing Unit) 21*a*, the RAM (Random Access Memory) 21*b*, the ROM (Read Only Memory) 21*c*, dedicated hardware circuits, and the like and performs overall operational control of the second electronic apparatus 20. The CPU 21*a* loads information processing programs stored in the ROM 21*c* in the RAM 21*b* and executes the information processing programs. The ROM 21*c* is a nonvolatile memory that stores programs executed by the CPU 21*a*, data, and the like. The ROM 21*c* is an example of a non-transitory computer readable recording medium.

The controller circuit 21 is connected to the image scanner 22, the image processor 24 (including GPU (Graphics Processing Unit)), the image memory 25, the image forming device 26 (printer), the operation device 27 including the display device 27*a* (touch panel), the large volume nonvolatile storage device 28 such as an HDD (Hard Disk Drive) or an SSD (Solid State Drive), the facsimile communication device 29, the network communication interface 23, and the like. The controller circuit 21 performs operational control of the respective devices connected thereto and sends/receives signals and data to/from those devices. The operation device 27 (touch panel) is one mode of an input module. A sound input module including a microphone may be provided as an input module.

3. Functional Configuration of Electronic Apparatus

Figure 4:
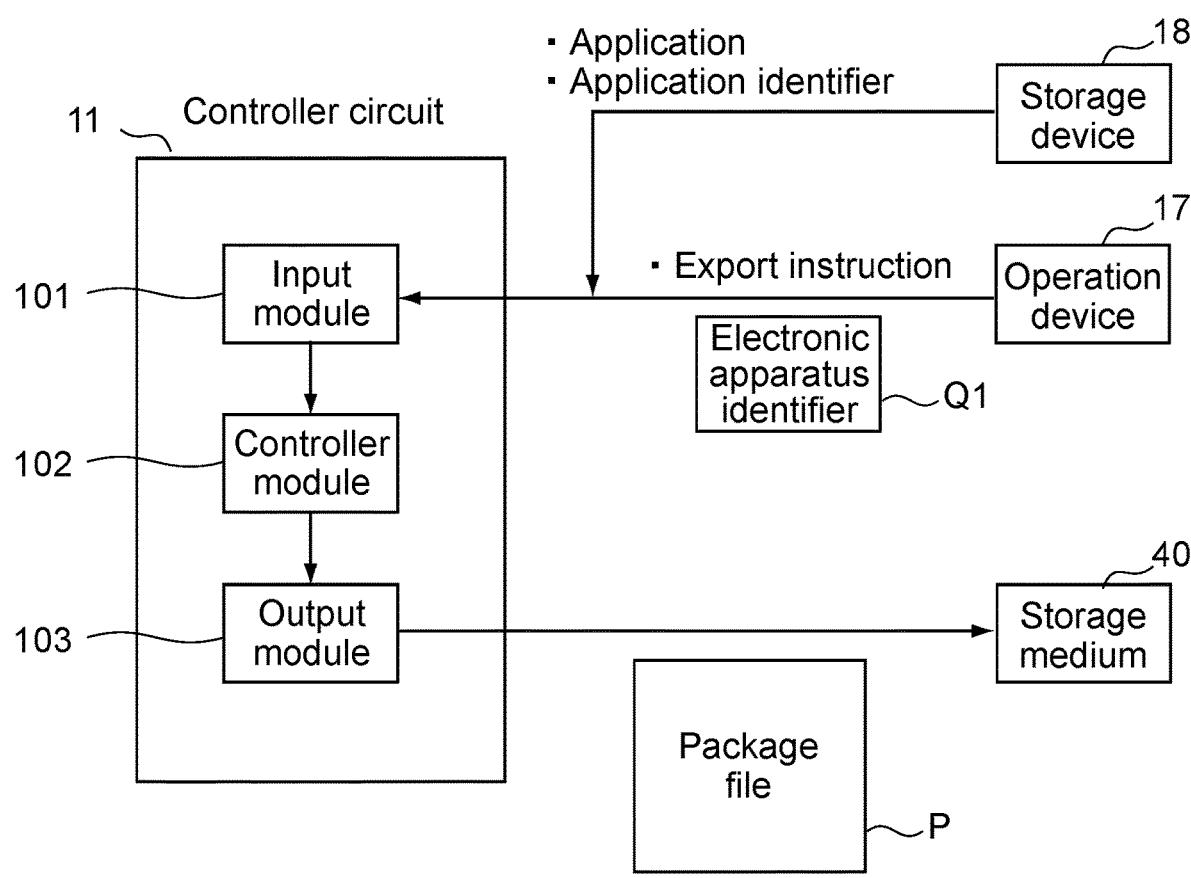
FIG. 4 shows a functional configuration of the first electronic apparatus.

FIG. 4 shows a functional configuration of the first electronic apparatus.

In the controller circuit 11 of the first electronic apparatus 10, the CPU 11*a* loads an information processing program stored in the ROM 11*c* in the RAM 11*b* and executes the information processing program to operate as the input module 101, the controller module 102, and the output module 103.

The input module 101 inputs an export instruction, the electronic apparatus identifier Q1, an application, and an application identifier in the controller module 102. The electronic apparatus identifier Q1 is a value unique to the second electronic apparatus 20. The application identifier is, for example, a serial number, and includes information identifying the application.

For example, in the present embodiment, a service person inputs the export instruction by operating the operation device 17.

For example, in the present embodiment, the service person inputs the electronic apparatus identifier Q1 by operating the operation device 17. Alternatively, the input module 101 may download the electronic apparatus identifier Q1 from a server apparatus (not shown) via a network, and input the electronic apparatus identifier Q1 in the controller module 102.

For example, in the present embodiment, the controller circuit 11 reads the application and the application identifier stored in the storage device 18, and inputs the application and the application identifier in the controller module 102.

Where an export instruction is input, the controller module 102 generates the package file P on the basis of the application, the application identifier, and the electronic apparatus identifier Q1.

The output module 103 writes the package file P in the storage medium 40.

Figure 5:
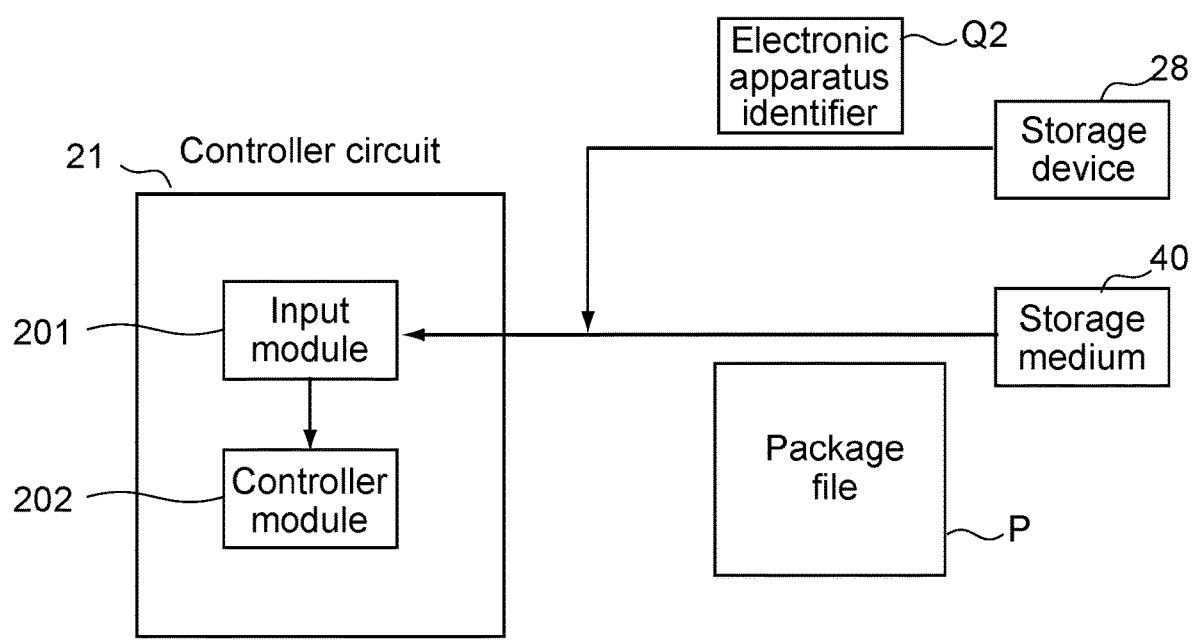
FIG. 5 shows a functional configuration of the second electronic apparatus.

FIG. 5 shows a functional configuration of the second electronic apparatus.

In the controller circuit 21 of the second electronic apparatus 20, the CPU 21a loads an information processing program stored in the ROM 21c in the RAM 21b and executes the information processing program to operate as the input module 201 and the controller module 202.

The input module 201 inputs the electronic apparatus identifier Q2 and the package file P in the controller module 202. The electronic apparatus identifier Q2 is a value unique to the second electronic apparatus 20.

For example, in the present embodiment, the storage device 28 stores the electronic apparatus identifier Q2. The input module 201 reads the electronic apparatus identifier Q2 from the storage device 28, and inputs the electronic apparatus identifier Q2 in the controller module 202. Alternatively, the input module 201 may download the electronic apparatus identifier Q2 from a server apparatus (not shown) via a network, and input the electronic apparatus identifier Q2 in the controller module 202.

For example, in the present embodiment, the package file P is stored in the storage medium 40. The input module 201 reads the package file P from the storage medium 40, and inputs the package file P in the controller module 202.

Where the package file P is input, the controller module 202 determines whether or not the package file P matches a certain condition, decompresses the package file P, and provisionally sets up the application.

Functional configurations of the electronic apparatuses have been described above. Hereinafter, an operational flow of the electronic apparatuses will be described.

4. Operational Flow of Electronic Apparatuses

Figure 6:
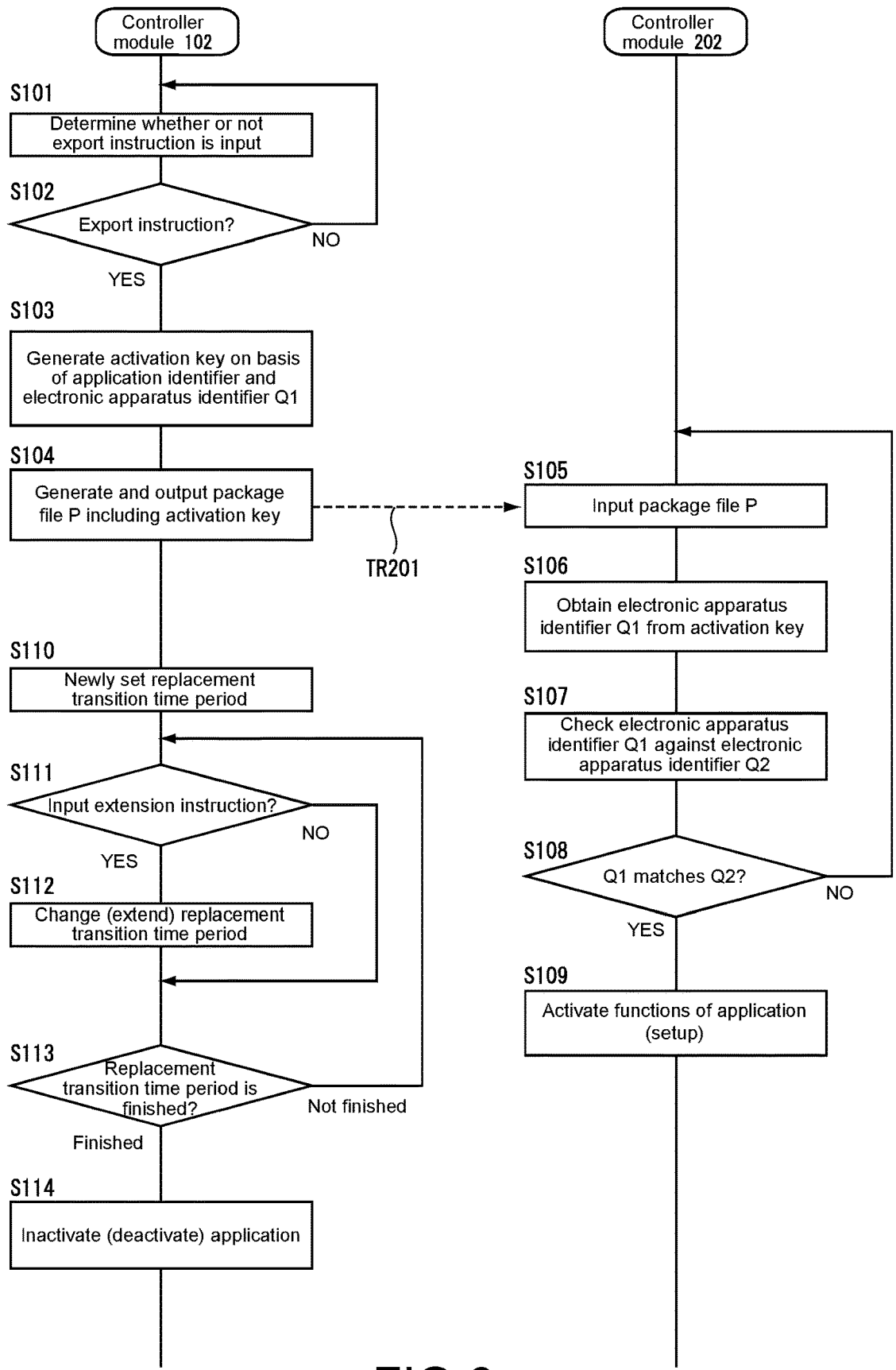
FIG. 6 shows an operational flow of the first electronic apparatus and the second electronic apparatus.

FIG. 6 shows an operational flow of the first electronic apparatus and the second electronic apparatus.

The controller module 102 of the controller circuit 11 determines whether or not an export instruction is input (Step S101). For example, where the input module 101 inputs an export instruction in the controller module 102, the controller module 102 determines that an export instruction is input (Step S102, YES). Meanwhile, where no export instruction is input in the controller module 102, the controller module 102 determines that no export instruction is input (Step S102, NO).

Where an export instruction is input, the controller module 102 generates an activation key on a basis of an application identifier and the electronic apparatus identifier Q1 (Step S103).

Subsequently, the controller module 102 generates the package file P including the generated activation key. The controller module 102 controls the output module 103 to output the generated package file P to the storage medium 40 (Step S104).

Note that, for example, in the present embodiment, the input module 101 inputs the export instruction and the electronic apparatus identifier Q1 on the basis of manual input of a service person. The output module 103 outputs the package file P by writing the package file P in the storage medium 40 such as a USB memory inserted by a service person. However, this is merely an example. Note that, in this case, the service person visits a client site of the first electronic apparatus 10 and operates as described above.

The package file P is output from the first electronic apparatus 10, and is transferred to and input in the second electronic apparatus 20 (TR201). For example, the package file P is transferred via the storage medium 40 and a service person. However, this is merely an example.

Where the input module 201 of the controller circuit 21 inputs the package file P (Step S105), the controller module 202 decodes and obtains the electronic apparatus identifier Q1 from the activation key in the package file P (Step S106).

Subsequently, the controller module 202 checks the electronic apparatus identifier Q1 obtained from the package file P against the electronic apparatus identifier Q2 of the apparatus itself for check stored in the storage device 28 of the apparatus itself (the second electronic apparatus 20) (Step S107).

Subsequently, the controller module 202 determines whether or not the electronic apparatus identifier Q1 matches the electronic apparatus identifier Q2 (Step S108). Where the electronic apparatus identifier Q1 does not match the electronic apparatus identifier Q2 (Step S108, NO), it is necessary to input a different package file P. So the controller module 202 stands by for re-input of the package file P (Return to Step S105).

Where the electronic apparatus identifier Q1 matches the electronic apparatus identifier Q2 (Step S108, YES), the controller module 202 installs the application such that functions of the application included in the package file P are activated (Step S109). Note that the application may be identified by the application identifier included in the package file P.

Here, the controller module 202 installs the application and, in addition, activates the application with the obtained activation key. As a result, immediately after the first electronic apparatus 10 is replaced by the second electronic apparatus 20, the application is activated in the second electronic apparatus 20. So a user (operator) of the second electronic apparatus 20 is capable of using the application without interruption. There is no so-called downtime.

Note that, for example, in the present embodiment, a service person inserts the storage medium 40 such as a USB memory in the second electronic apparatus 20 at a service center or the like to input the package file P. However, this is merely an example.

Meanwhile, in the first electronic apparatus 10, the controller module 102 of the controller circuit 11 newly sets a "replacement transition time period" starting from the output time point of the package file P (Step S110).

The "replacement transition time period" is, for example, a time period arbitrarily set depending on a time period required from setup of the second electronic apparatus 20 to carrying the second electronic apparatus 20 into the site of the first electronic apparatus 10. For example, a time period such as one week is set. The replacement transition time period may be specified by a service person every time. Alternatively, a platform or a firmware may have a replacement transition time period, i.e., a predetermined number of days.

During the replacement transition time period, the controller module 102 does not restrict use of the application by a user or restrict functions even if the package file P and the activation key are output. So a user may use the application without restriction.

The replacement transition time period is extendable. The input module 101 inputs an extension instruction in the controller module 102 on a basis of an instruction input manually by a user or a service person using the operation device 17 or input via a network via the network communication interface 13.

The controller module 102 determines whether or not the input module 101 inputs an extension instruction in the controller module 102 (Step S111). Where the extension instruction is input (Step S111, YES), the controller module 102 changes and extends the replacement transition time period for an instructed time period or a certain time period (for example, one day, etc.) (Step S112).

After that, the controller module 102 determines whether or not the replacement transition time period is finished (Step S113). After the replacement transition time period is finished (Step S113, Finished), the controller module 102 does not accept extension of the replacement transition time period.

After the replacement transition time period is finished (Step S113, Finished), the controller module 102 inactivates the application (Step S114). Specifically, the application is inactivated, functions are locked or deactivated. As a result, invalid use of the application in the old electronic apparatus is prohibited.

A service person carries the setup second electronic apparatus 20 (Step S109) into the site of the first electronic apparatus 10, and removes the first electronic apparatus 10 from the site. The controller module 102 of the first electronic apparatus 10 executes all the aforementioned information processing including newly setting the replacement transition time period, counting the replacement transition time period, and deactivation after the replacement transition time period is finished. As a result, the application is inactivated automatically without inputting any operation in the first electronic apparatus 10, i.e., the old apparatus, by a service person.

5. Modification Examples

In the present embodiment, a data structure or a format of information included in the package file P is not limited. However, the controller module 102 of the first electronic apparatus 10 may encode the package file P to avoid changes of the file.

In the present embodiment, the controller module 102 outputs the package file P (Step S104) and, after that, newly sets the replacement transition time period (Step S110). However, the order may be inversed or simultaneous.

In an example of the present embodiment, a service person transfers the package file P (TR201). However, a computer system may transfer the package file P via a network without a service person in the following mode.

Figure 7:
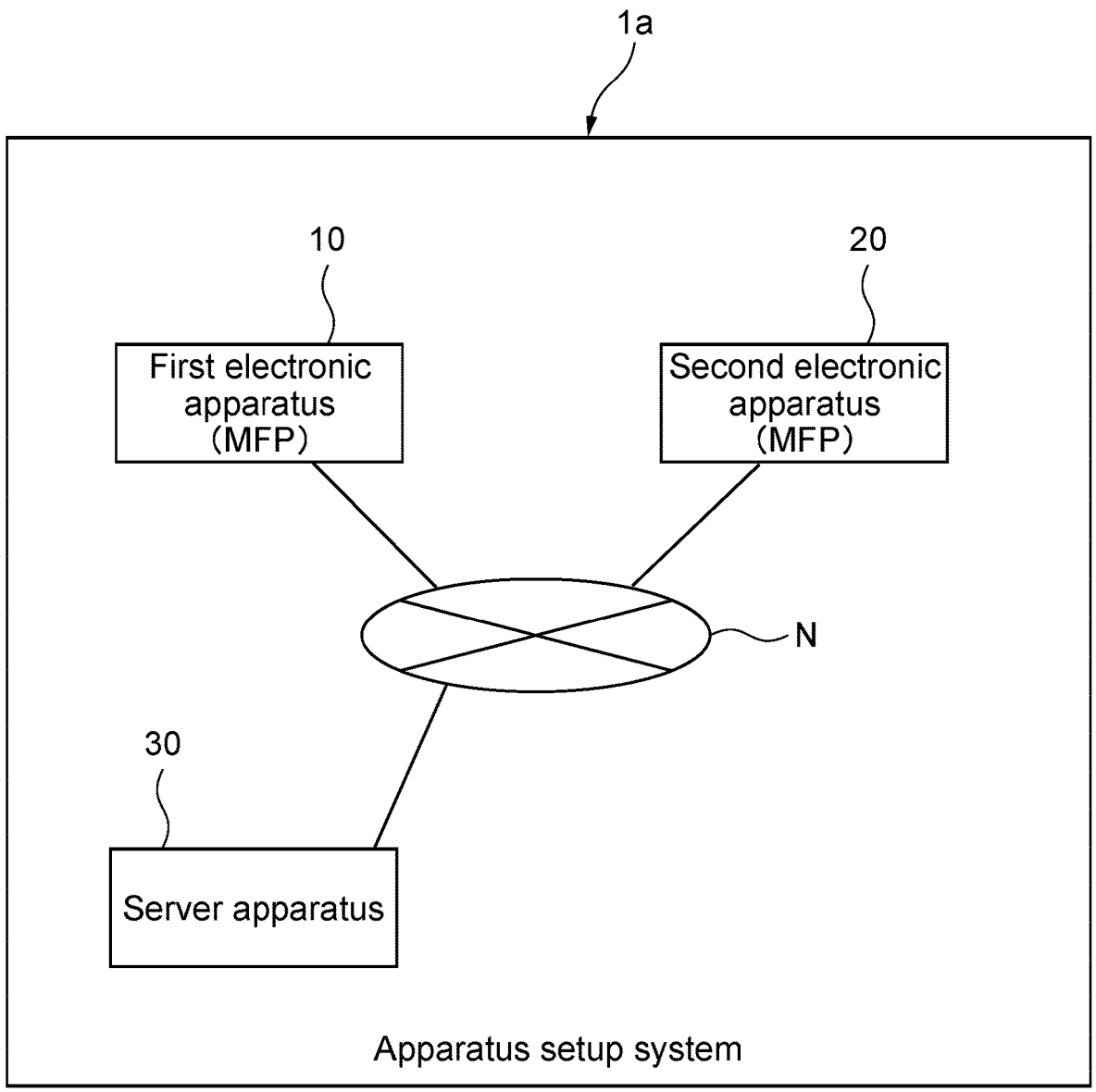
FIG. 7 shows a network configuration of an apparatus setup system according to a modification example of the present embodiment.

FIG. 7 shows a network configuration of an apparatus setup system according to a modification example of the present embodiment.

In the present modification example, the apparatus setup system 1a includes the first electronic apparatus 10, the second electronic apparatus 20, and the server apparatus 30. The first electronic apparatus 10, the second electronic apparatus 20, and the server apparatus 30 are communicably connected to each other via network N.

The configuration of each of the first electronic apparatus 10 and the second electronic apparatus 20 is the same as that of the embodiment, and will not be described.

Figure 8:
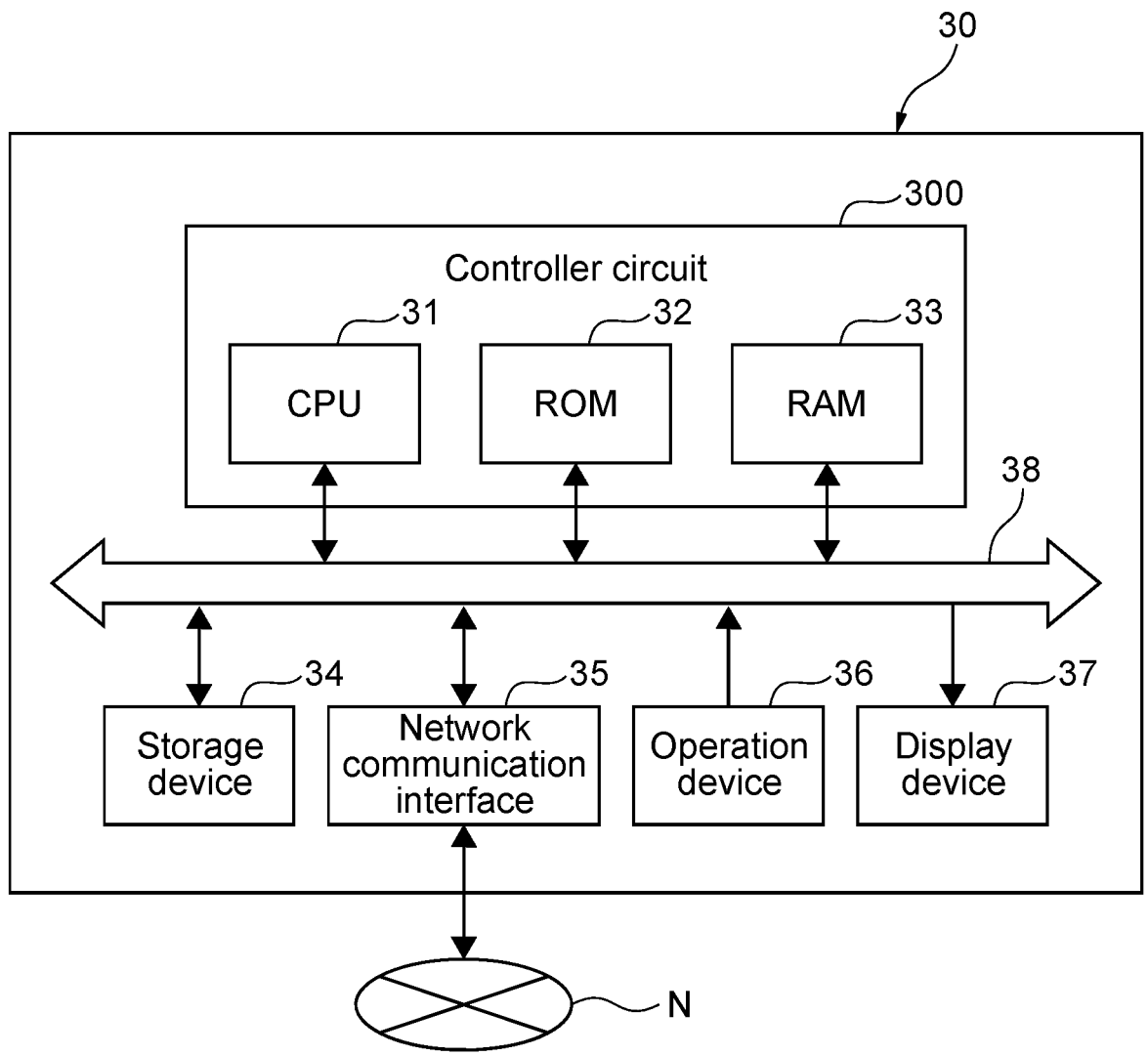
FIG. 8 shows a hardware configuration of a server apparatus.

FIG. 8 shows a hardware configuration of a server apparatus.

The server apparatus 30 includes the CPU 31, the ROM 32, the RAM 33, the storage device 34, which is a large-volume nonvolatile memory such as an HDD or an SSD, the network communication interface 35, the operation device 36, and the display device 37, and the bus 38 connecting them to each other.

The controller circuit 300 includes the CPU 31, the ROM 32, and the RAM 33. The CPU 31 loads information processing programs stored in the ROM 32 in the RAM 33 and executes the information processing programs. The ROM 32 stores programs executed by the CPU 31, data, and the like nonvolatile. The ROM 32 is an example of a non-transitory computer readable recording medium.

The controller circuit 300 of the server apparatus 30 inputs the export instruction in the first electronic apparatus 10, receives the output package file P, inputs the received package file P in the second electronic apparatus 20, and inputs the extension instruction in the first electronic apparatus 10 by using the network configuration and the hardware configuration.

Meanwhile, the controller module 102 of the first electronic apparatus 10 controls the output module 103 to output (send) the package file P including the activation key to the server apparatus 30. Further, where the input module 101 receives the export instruction and the extension instruction input in the first electronic apparatus 10 from the server apparatus 30, the input module 101 inputs the export instruction and the extension instruction in the controller module 102.

Further, where the input module 201 of the second electronic apparatus 20 receives the package file P from the server apparatus 30, the input module 201 inputs the package file P in the controller module 202.

The controller circuit 300 of the server apparatus 30 receives the package file P from the first electronic apparatus 10 via network communication interface 35. Then the controller circuit 300 temporarily stores the package file P in the storage device 34, and controls the network communication interface 35 to send the package file P to the second electronic apparatus 20.

According to the aforementioned modification example, a downtime may be reduced independent of work of a service person.

Any configurations disclosed in the present embodiment may be embodied in combination.

6. Conclusion

Typically, it is necessary to transfer a license and set up a new electronic apparatus at a site of an electronic apparatus. It takes time to transfer a license and set up a new electronic apparatus, which is a downtime. In other words, a user of the electronic apparatus is incapable of using the electronic apparatus during the downtime. Setup includes obtaining an activation key and application of the activation key in an electronic apparatus.

When an electronic apparatus is replaced suddenly, it may take long time to apply an obtained activation key after an application to issue the activation key is filed. In this case, according to the aforementioned method of transferring a license and setting up a new electronic apparatus at a site of an electronic apparatus, the whole schedule of replacement work may be longer or the work schedule may not be prepared, which is troublesome.

(1) To the contrary, according to the present embodiment, the electronic apparatus outputs a package file including an activation key and an application for export, the activation key being for activating the application only in one different electronic apparatus. Meanwhile, the electronic apparatus inactivates the application activated in the electronic apparatus after a certain replacement transition time period passes. As a result, there is no time period in which the application is inactivated in the new electronic apparatus when an electronic apparatus is replaced, where the electronic apparatus has an application that requires an activation key for activation. Invalid use of the application in the old electronic apparatus is prohibited.

(2) According to the present embodiment, after the activation key is output, if it is at a time point before an end time point of the replacement transition time period, the electronic apparatus extends the replacement transition time period where an extension instruction is input. As a result, even if transfer work is not completed in the replacement transition time period, it is possible to prevent a time period in which a user of the electronic apparatus cannot use the application. Further, according to the present embodiment, after the replacement transition time period is finished, the electronic apparatus is not capable of extending the replacement transition time period. As a result, invalid use of the application is prohibited.

(3) According to the present embodiment, the electronic apparatus inputs an export instruction and outputs the package file via information communication with a server apparatus connected to a communication network. As a result, transfer work is executed independent of work of a service person or the like.

It should be understood by those skilled in the art that various modifications, combinations, sub-combinations and alterations may occur depending on design requirements and other factors insofar as they are within the scope of the appended claims or the equivalents thereof

What is claimed is:

1. An electronic apparatus, comprising:
    an input module configured to input an export instruction and an electronic apparatus identifier corresponding to one different electronic apparatus, the export instruction instructing to export an application;
    a controller module configured to
        generate an activation key on a basis of the electronic apparatus identifier corresponding to the one different electronic apparatus where the export instruction is input, the activation key being for activating the application only in the one different electronic apparatus,
        control to output a package file including the application and the activation key,
        set a replacement transition time period starting from an output time point of the package file, and
        inactivate the application in the electronic apparatus after the replacement transition time period passes; and
    an output module configured to output the package file controlled by the controller module.

2. The electronic apparatus according to claim 1, wherein the controller module is configured to, after the activation key is output, if it is at a time point before an end time point of the replacement transition time period, extend the replacement transition time period where an extension instruction is input, the extension instruction instructing to extend the replacement transition time period.

3. The electronic apparatus according to claim 1, wherein the input module is configured to
    receive the export instruction and the electronic apparatus identifier corresponding to the one different electronic apparatus from a server apparatus connected to a communication network, and
    input the export instruction and the electronic apparatus identifier in the controller module, and
the output module is configured to send the package file to the server apparatus.

4. The electronic apparatus according to claim 1, wherein the controller module is configured to set the replacement transition time period after outputting the package file where the export instruction is input.

5. The electronic apparatus according to claim 1, wherein the controller module is configured to output the package file after setting the replacement transition time period where the export instruction is input.

6. A method of controlling an electronic apparatus, comprising:
    inputting an export instruction and an electronic apparatus identifier corresponding to one different electronic apparatus, the export instruction instructing to export an application;
    generating an activation key on a basis of the electronic apparatus identifier corresponding to the one different electronic apparatus on a basis of the export instruction, the activation key being for activating the application only in the one different electronic apparatus;
    controlling to output a package file including the application and the activation key;
    thereafter setting a replacement transition time period starting from an output time point of the package file; and
    inactivating the application in the electronic apparatus after the replacement transition time period passes.

7. A method of controlling an electronic apparatus, comprising:
    inputting an export instruction and an electronic apparatus identifier corresponding to one different electronic apparatus, the export instruction instructing to export an application;
    generating an activation key on a basis of the electronic apparatus identifier corresponding to the one different electronic apparatus on a basis of the export instruction, the activation key being for activating the application only in the one different electronic apparatus;
    setting a replacement transition time period starting from an output time point of the package file;
    thereafter controlling to output a package file including the application and the activation key; and
    inactivating the application in the electronic apparatus after the replacement transition time period passes.

* * * * *